United States Patent
Guo (10) Patent No.: US 7,012,387 B1
(45) Date of Patent: Mar. 14, 2006

(54) CIRCUIT THAT ELIMINATES THE SNEAK PATH FOR DUAL-SPEED DC MOTORS

(75) Inventor: Sam Y. Guo, Canton, MI (US)

(73) Assignee: Yazaki North America, Inc., Canton, MI (US)

(*) Notice: Subject to any disclaimer, the term of this patent is extended or adjusted under 35 U.S.C. 154(b) by 0 days.

(21) Appl. No.: 10/758,311

(22) Filed: Jan. 15, 2004

(51) Int. Cl.
*H02P 3/18* (2006.01)

(52) U.S. Cl. .................. 318/254; 318/138; 318/439; 318/770

(58) Field of Classification Search ............. 318/254, 318/138, 439, 770, 772, 778, 779
See application file for complete search history.

(56) References Cited

U.S. PATENT DOCUMENTS

| | | | | |
|---|---|---|---|---|
| 4,359,674 A | * | 11/1982 | Gotou | ............ 318/254 |
| 5,120,981 A | * | 6/1992 | Cope | ............ 307/10.8 |
| 5,883,490 A | * | 3/1999 | Moreira | ............ 318/807 |
| 5,892,349 A | * | 4/1999 | Bogwicz et al. | ............ 318/772 |
| 5,932,981 A | * | 8/1999 | Vrionis | ............ 318/480 |
| 6,188,247 B1 | | 2/2001 | Storino et al. | |
| 6,262,545 B1 | * | 7/2001 | Yamamoto | ............ 318/254 |
| 6,288,572 B1 | | 9/2001 | Nowka | |
| 6,304,046 B1 | * | 10/2001 | Lee et al. | ............ 318/439 |

* cited by examiner

*Primary Examiner*—Rina Duda
(74) *Attorney, Agent, or Firm*—Rader, Fishman & Grauer PLLC (57) ABSTRACT

A system for controlling a dual-speed motor includes a direct current (DC) power supply, a dual-speed DC motor, a first solid-state switch electrically coupled to the DC power supply and a low-speed input of the dual-speed DC motor, a second solid-state switch electrically coupled to the DC power supply and a high-speed input of the dual-speed DC motor, and a solid-state switch electrically coupled between the first solid-state switch and the low-speed input of the dual-speed DC motor, wherein a first side of the solid-state switch is coupled to a power supply side of the system and a second side of the solid-state switch is coupled to a load side of the system.

21 Claims, 6 Drawing Sheets

CIRCUIT THAT ELIMINATES THE SNEAK PATH FOR DUAL-SPEED DC MOTORS

FIELD

The present system and method relates to switches used in DC motors. More particularly, the present system and method provides a circuit for eliminating a sneak path in dual-speed DC motors.

BACKGROUND

Dual-speed direct current (DC) motors are used in a number of applications. Uses of dual-speed DC motors may range from use in computer disk drives to sewing machines. DC motors are often used in portable devices such as laptop computers in an effort to maximize battery efficiency. In the auto industry, DC motors are typically used to operate windshield wipers and radiator fans. Effective and precise control of the dual-speed motor aids in increasing battery efficiency and motor life.

Figure 1:
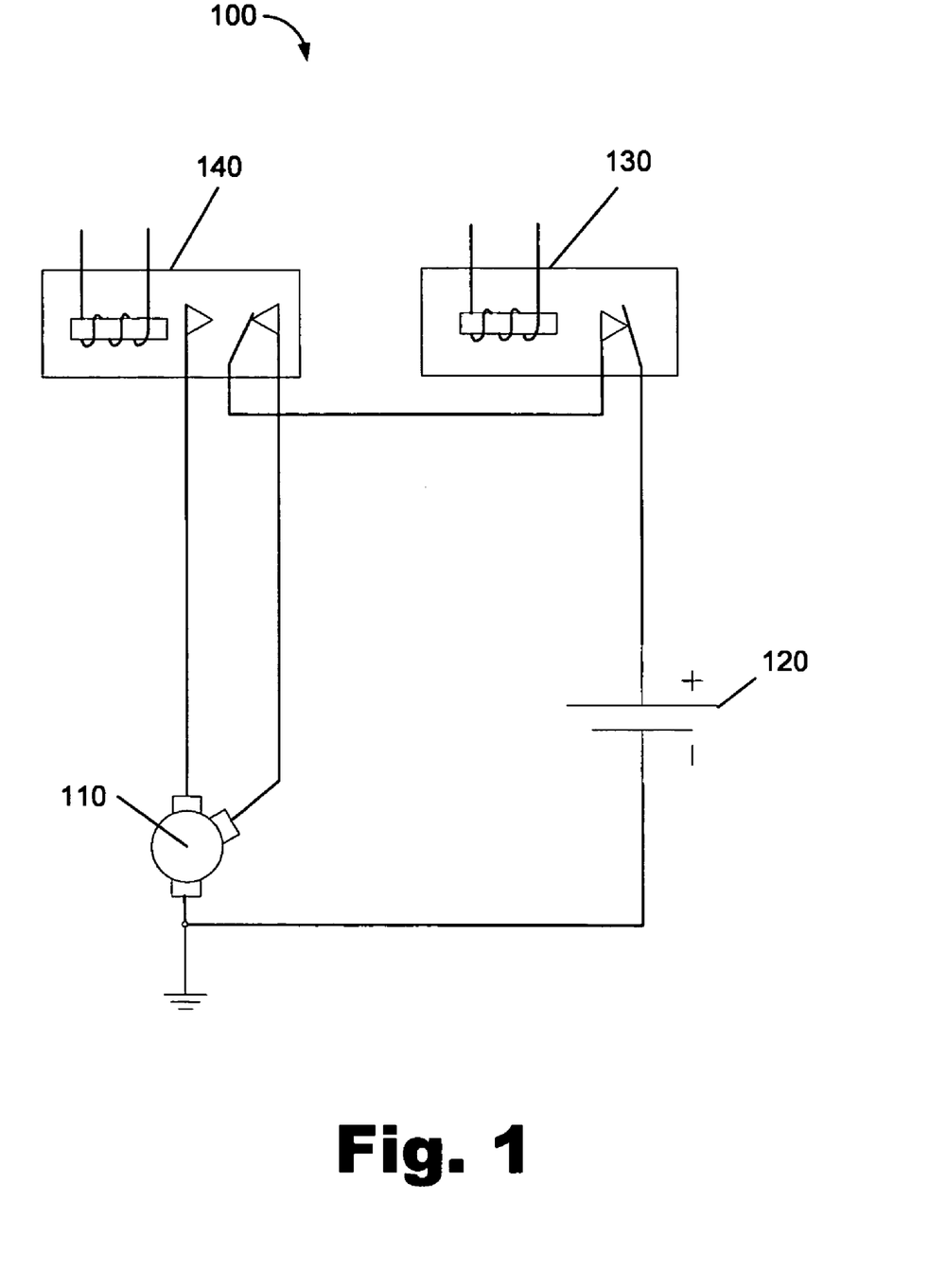
FIG. 1 is a simple circuit diagram illustrating a traditional dual-speed DC motor control according to the prior art.

FIG. 1 illustrates a mechanical relay system (100) used in traditional dual-speed DC motor (110) control. As shown in FIG. 1, two mechanical relays (140, 130) were traditionally used. The first relay (130) is used to control the ON/OFF of the motor (110) by selectively providing DC power from the DC power supply (120). The second relay (140) illustrated in FIG. 1 is used to control the Hi/Low-speed of the motor (110). While the traditional mechanical relay system (100) used in FIG. 1 enabled dual-speed DC motor control, the size of the relays (130, 140) used in the traditional mechanical relay system (100) is bulky and the reliability and lifespan of the mechanical relays is poor.

With the development of semiconductor technology, mechanical relays are being replaced by solid-state switches. Solid-state switches are replacing mechanical relays due to their low cost, long life span, and increased reliability when compared to the traditional mechanical relays. However, the use of solid-state switches does have a number of drawbacks as well. One drawback of using solid-state switches to replace mechanical relays is that the solid-state switches, either MOSFET type or IGBT type, can only block or switch off the current in a single direction. In the opposite direction, the body diode of the transistor will be always conducting even when the switch is operating in the OFF mode. Consequently, it is impossible to switch the solid-state switch OFF in the opposite direction. Due to the inability to block or switch a current OFF in both directions, the use of solid-state switches in dual-speed motor control has been limited.

SUMMARY

A system for controlling a dual-speed motor includes a direct current (DC) power supply, a dual-speed DC motor, a first solid-state switch electrically coupled to the DC power supply and a low-speed input of the dual-speed DC motor, a second solid-state switch electrically coupled to the DC power supply and a high-speed input of the dual-speed DC motor, and a solid-state switch electrically coupled between the first solid-state switch and the low-speed input of the dual-speed DC motor, wherein a first side of the solid-state switch is coupled to a power supply side of the system and a second side of the solid-state switch is coupled to a load side of the system.

BRIEF DESCRIPTION OF THE DRAWINGS

The accompanying drawings illustrate various embodiments of the present method and system and are a part of the specification. Together with the following description, the drawings demonstrate and explain the principles of the present method and system. The illustrated embodiments are examples of the present method and system and do not limit the scope thereof.

Throughout the drawings, identical reference numbers designate similar but not necessarily identical elements.

DETAILED DESCRIPTION

The present specification describes a system and a method for eliminating a sneak path for dual-speed DC motors. More specifically, the present system and method includes a DC power supply, a dual-speed DC motor, a first solid-state switch electrically coupled to both the DC power supply and a low-speed input of the dual-speed DC motor, a second solid-state switch electrically coupled to both the DC power supply and a high-speed input of the dual-speed DC motor, and a solid-state switch electrically coupled between the first solid-state switch and the low-speed input of the dual-speed DC motor. According to one exemplary embodiment, a first side of the solid-state switch is coupled to a power supply side of the system and a second side of the solid-state switch is coupled to a load side of the system thereby eliminating a sneak path.

In the present specification and in the appended claims, the term "solid-state" or "solid-state switches" is meant to be understood broadly as any switch or other electrical device that uses solid materials and the electric and magnetic effects within them, rather than mechanical operation, to perform a switching function. Semiconductors, integrated circuits, and transistors are examples of solid-state components. Additionally, a "dual-speed motor" is meant to be understood broadly as any electronic device configured to operate in more than one setting by changing a DC signal provided thereto. A "sneak path" is meant to be understood both here and in the appended claims as referring to an electric motive force generated by the spinning of an armature of a DC motor that generates an unintended current path. "EMF or electro motive force" is meant to be understood as any force, measured in volts that is produced by interaction between a current and a magnetic field, at least one of which is changing.

In the following description, for purposes of explanation, numerous specific details are set forth in order to provide a thorough understanding of the present system and method for eliminating the sneak path for dual-speed DC motors. It will be apparent, however, to one skilled in the art that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Overall Structure

Figure 2:
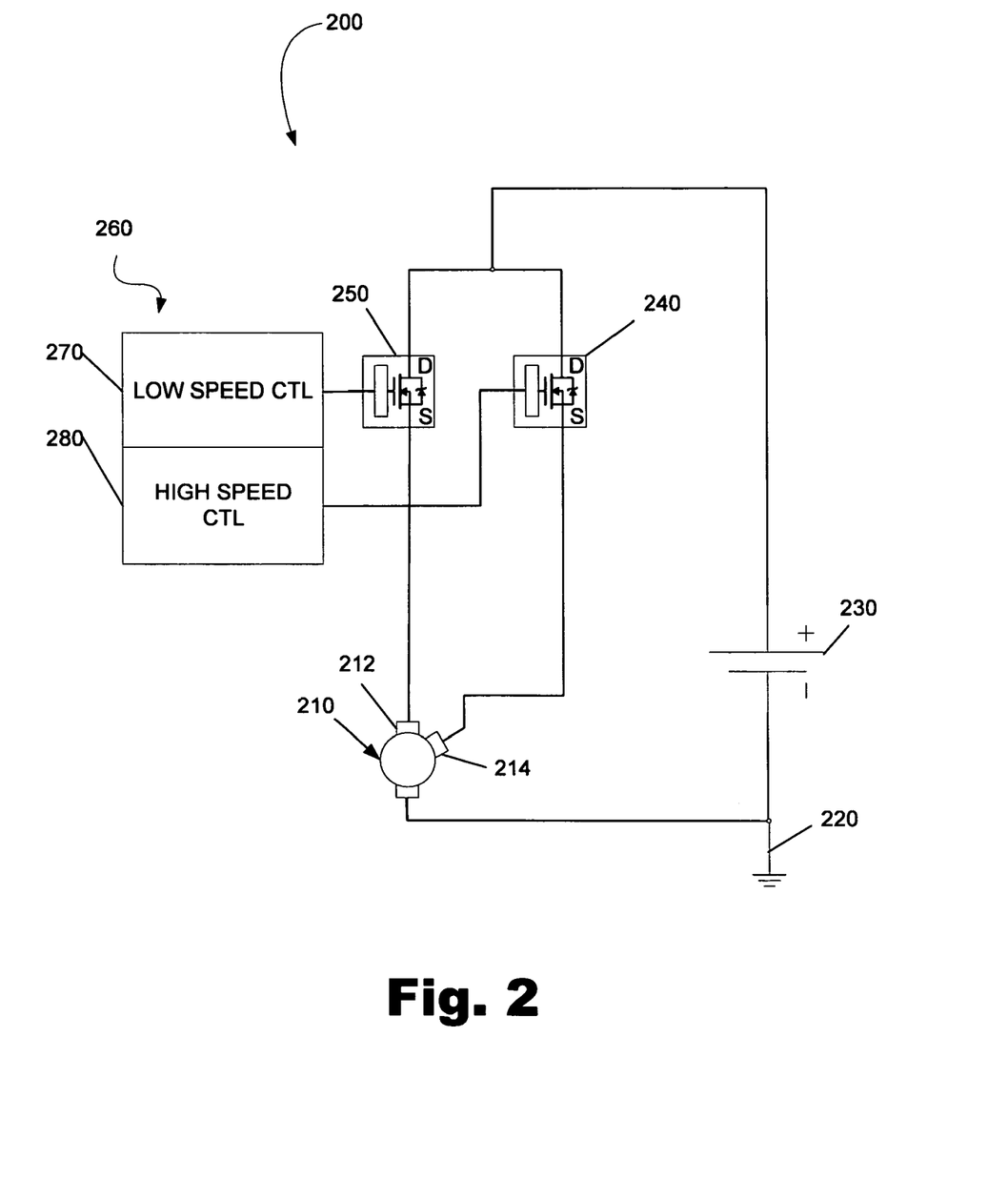
FIG. 2 is a simple circuit diagram illustrating a dual-speed DC motor control including two individual intelligent solid-state switches according to one exemplary embodiment.

FIG. 2 depicts a simple circuit diagram illustrating a dual-speed DC motor control circuit (200) including two individual intelligent solid-state switches (240, 250) according to one exemplary embodiment. As shown in FIG. 2, a first (240) and a second (250) individual intelligent solid-state switch may be connected to the high-speed (280) and low-speed (270) components of a microcontroller (260) respectively. Additionally, the drain (D) of each intelligent solid-state switch (240, 250) is coupled to a DC power supply (230) as shown in FIG. 2. Additionally, as illustrated in FIG. 2, the source (S) of the first solid-state switch (240) is coupled to a high-speed terminal (214) of a dual-speed DC motor (210) and the source (S) of the second solid-state switch (250) is coupled to a low-speed terminal (212) of the dual-speed DC motor. Moreover, the dual-speed motor control circuit (200) is completed by coupling the dual-speed DC motor (210) to ground (220) and a negative terminal of the DC power supply (230).

One of ordinary skill in the art will recognize that the dual-speed motor control circuit (200) illustrated in FIG. 2 merely replaces the mechanical relays (130, 140; FIG. 1) of the mechanical relay system (100; FIG. 1) illustrated in FIG. 1 with solid-state switches (240, 250). Theoretically, the replacement of the mechanical relays (130, 140; FIG. 1) with the solid-state switches (240, 250) presents a number of advantages. The advantages produced by incorporating the solid-state switches include a number of protection features including, but in no way limited to, short circuit protection, over-current protection, over temperature protection, etc. Moreover, contrary to mechanical switches, solid-state switches have load status detection, such as open load, short load, etc.; do not have arc problems; the on-resistance does not increase with aging; have no moving parts to reduce useful life; and are small in size. However, the use of solid-state switches (240, 250) in the circuit illustrated in FIG. 2 presents a number of issues during operation as described below with reference to FIGS. 3 and 4.

Figure 3:
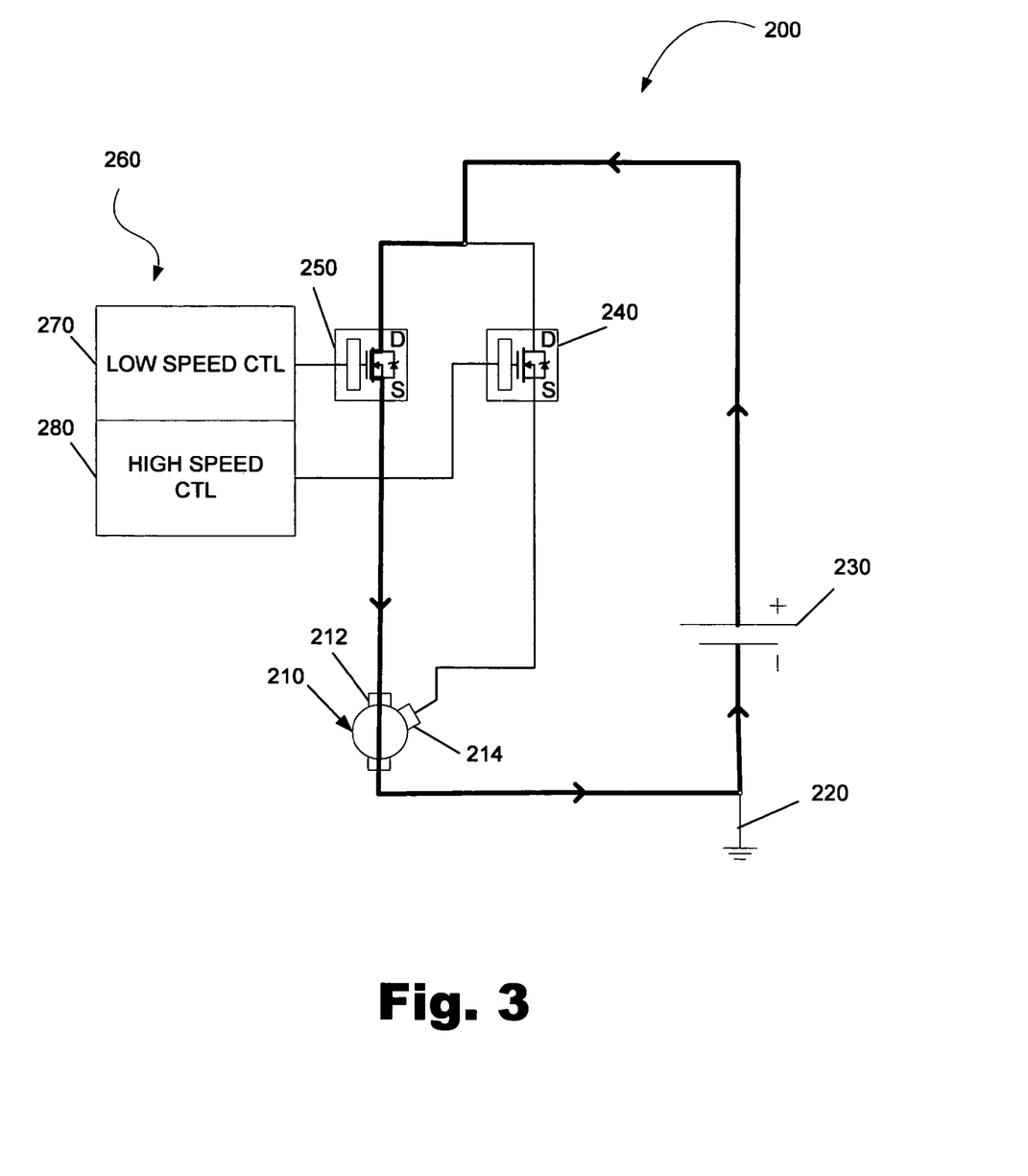
FIG. 3 is a simple circuit diagram illustrating a dual-speed DC motor control operating in a low-speed mode according to one exemplary embodiment.

FIG. 3 illustrates the dual-speed motor control circuit (200) of FIG. 2 operating in low-speed mode. As shown in FIG. 3, the DC power supply (230) provides power to both solid-state switches (240, 250). According to one exemplary embodiment, the DC power supply (230) provides 14V of direct current power to the dual-speed motor control circuit (200). While power is supplied to both switches (240, 250), the switches (240, 250) will only pass the power on to the terminals (212, 214) of the DC motor (210) when activated by a signal provided from the microcontroller (260). As illustrated in FIG. 3, when operating in low-speed mode, the low-speed control (270) of the microcontroller (260) activates the second solid-state switch (250). By activating the second solid-state switch (250), the current from the DC power supply (230) is allowed to pass through the second solid-state switch (250), and onto the low-speed terminal (212) of the DC motor (210), thereby causing the DC motor to operate at a low-speed. As shown in FIG. 3, the dual-speed motor control circuit (200) functions properly in low-speed mode. The circuit path is illustrated by the arrows in FIG. 3. As shown in FIG. 3, the current path is DC power supply (230)(+)—second solid-state switch (250)—low-speed terminal (212)—DC motor (210)—DC power supply (230)(−)—DC power supply (230)(+).

When the DC motor (210) is in operation, the spinning of an armature (not shown) of the DC motor (210) induces an Electro Motive Force (EMF) in the terminals (212, 214) of the armature. In low-speed mode, the low-speed terminal (212) is powered by the power supply, equaling 14V according to one exemplary embodiment. There is also an induced EMF on the high-speed terminal (214). However, the value of the induced EMF on the high-speed terminal (214) is always lower than the voltage on the low-speed terminal (212) during low-speed operation. According to one exemplary embodiment, the EMF produced on the high-speed terminal (214) is approximately 8V when 14V is supplied to the low-speed terminal (212). Because the EMF produced on the high-speed terminal is low, the body diode of the first solid-state switch (240) is not conducting. Consequently, there is no sneak path in the circuit illustrated in FIG. 3 when operating in low-speed mode. However, when operating in high-speed mode, as illustrated in FIG. 4, a serious problem results.

Figure 4:
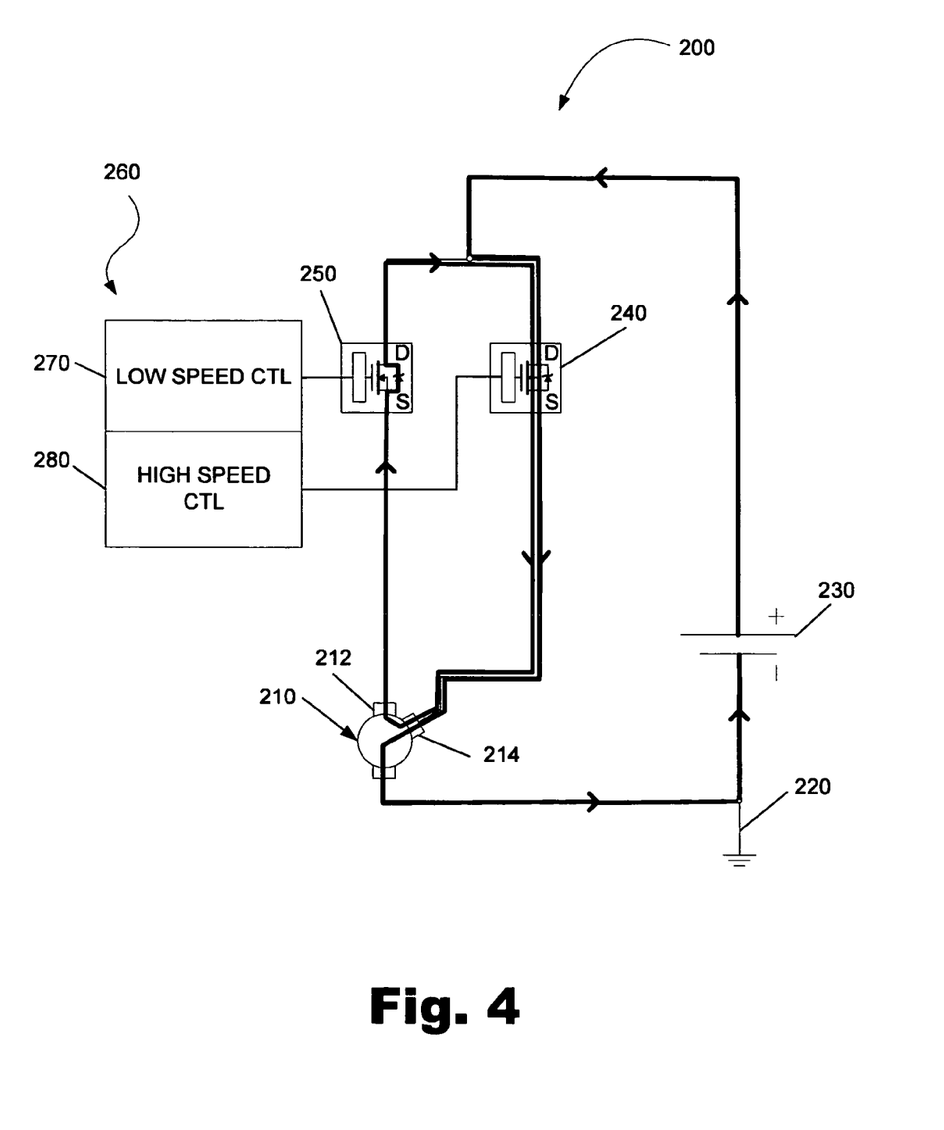
FIG. 4 is a simple circuit diagram illustrating a dual-speed DC motor control operating in a high-speed mode according to one exemplary embodiment.

FIG. 4 illustrates the dual-speed motor control circuit (200) of FIG. 2 when operating in high-speed mode. As shown in FIG. 4, when the dual-speed motor control circuit (200) operates in high-speed mode, the second solid-state switch (250) is OFF and the first solid-state switch (240) is activated. Similar to the embodiment illustrated above, the first solid-state switch (240) is activated by the high-speed control (280) of the microcontroller (260). When activated, the first solid-state switch (240) allows the current from the DC power supply (230) to pass through the first solid-state switch (240) and onto the high-speed terminal (214). Consequently, the high-speed terminal (214) of the DC motor (210) is powered by the battery having a voltage of 14V according to one exemplary embodiment. The current path produced during high-speed operation is illustrated by the arrows in FIG. 4 as DC power supply (230)(+)—the first solid-state switch (240)—high-speed terminal (214)—DC motor (210)—DC power supply (230)(−)—DC power supply (230)(+). This path is desirable.

However, when the DC motor (210) is in operation, the spinning of an armature (not shown) of the DC motor (210) induces an Electro Motive Force (EMF) in the terminals (212, 214) of the armature. When the high-speed terminal is powered by the DC power supply, receiving 14V according to one exemplary embodiment, the EMF induced by the high-speed terminal (214) is lower than the DC power supply (230) voltage while the EMF induced by the low-speed terminal (212) is much higher than the DC power supply (230) voltage. According to one exemplary embodiment, when the high-speed terminal is powered by the DC power supply, the EMF induced by the low-speed terminal (212) is approximately 20V. In other words, the dual-speed DC motor (210) functions as both a motor and a generator at the same time. The dual-speed DC motor (210) is powered by a low voltage (14V) at the high-speed terminal (214) and generates a higher voltage (20V) at the low-speed terminal (212).

In the circuit illustrated in FIG. 4, the low-speed terminal is connected to the DC power supply (230) through the second solid-state switch (250). As noted above, the second solid-state switch (250) cannot block the generated current from S to D due to its body diode. Consequently, when operating in high-speed mode as illustrated in FIG. 4, there is a current path for the higher voltage generated at the low-speed terminal. As indicated by the arrows in FIG. 4, the current path flows from the low-speed terminal (212)—body diode of the second solid-state switch (250)(even though it is OFF)—to the first solid-state switch (first solid-state switch is ON)—high-speed terminal (214)—motor armature (not shown)—low-speed terminal (212). This path illustrated above is called a sneak path. The current flowing in the sneak path is also called a sneak current. Since the internal impedance of the motor (210) is low, the sneak current is very large, typically on the order of tens of Amperes. Consequently, the sneak current consumes about 30% of the power the motor (210) draws from the DC power supply (230) at the high-speed terminal (214) and transfers this power into heat and heats up the second solid-state switch (250), the first solid-state switch (240), and the DC motor (210). As a result, the motor speed slows down even though it draws more power from the DC power supply (230).

Additionally, when the body diode of the second solid-state switch (250) carries tens of Amperes sneak current, the forward voltage drop across the body diode will be close to 2V. A large heat sink (larger than the traditional mechanical relay) is required to prevent the second solid-state switch (250) from being burned out. Consequently, the circuit (200) illustrated in FIG. 2 has little application value due to the sneak path that is generated when operating in high-speed mode as illustrated in FIG. 4.

Figure 5:
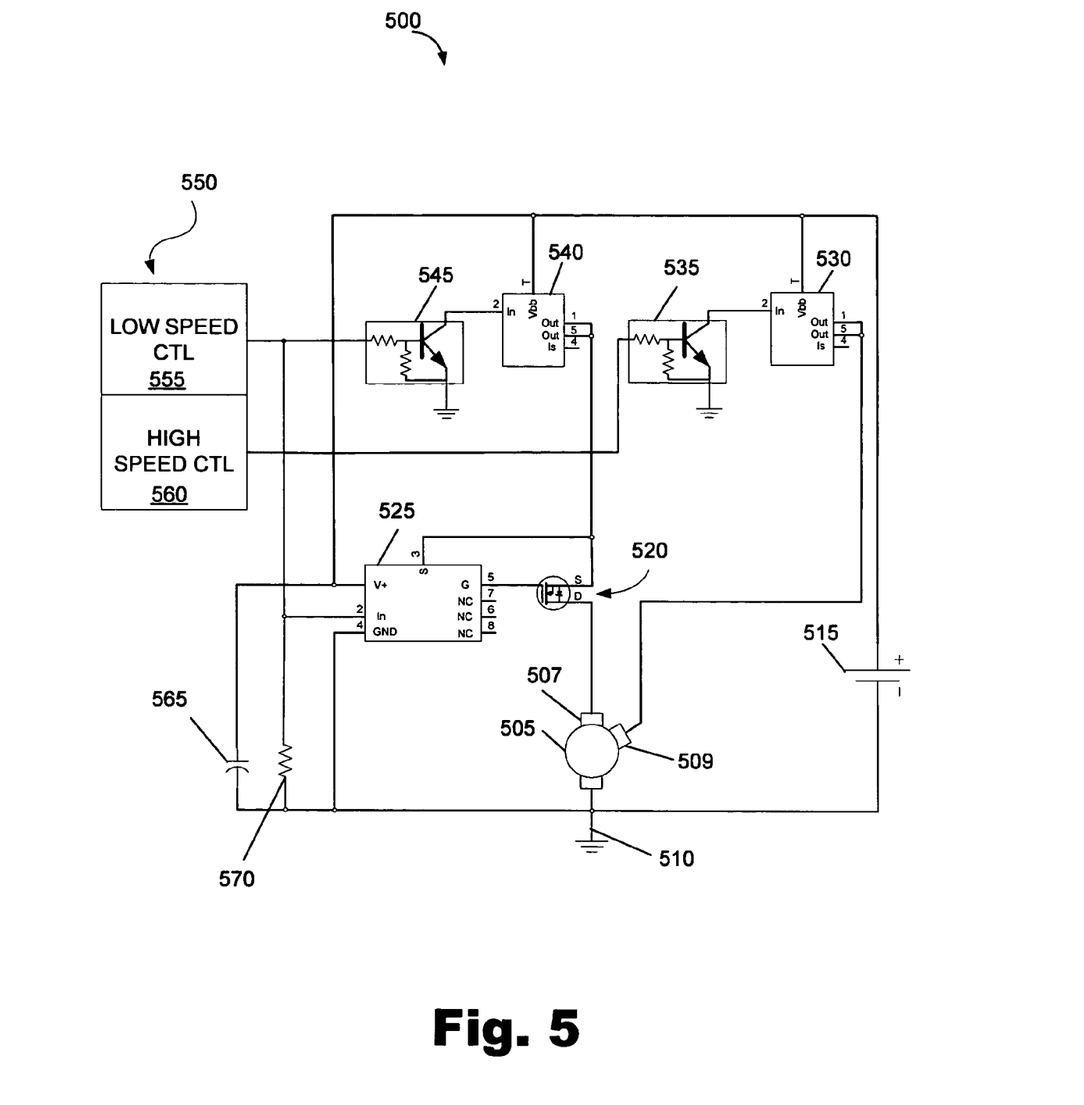
FIG. 5 is a simple circuit diagram illustrating a dual-speed DC motor control that eliminates the sneak path according to one exemplary embodiment.

FIG. 5 illustrates an exemplary embodiment of a dual-speed motor control circuit (500) incorporating intelligent solid-state switches while eliminating the sneak path for dual-speed motors described above. As illustrated in FIG. 5, the circuit (500) includes a dual-speed DC motor (505) electrically coupled to both a ground (510) and a DC power source (515). In turn, the power source (515) is electrically coupled to the power input (Vbb) of a first (530) and a second (540) solid-state switch as well as the power input (V+) of a gate driver (525). According to one exemplary embodiment, the first (530) and second (540) solid-state switches are intelligent solid-state switches. The term "intelligent solid-state switches" is meant to be understood broadly as including any solid-state switch configured to include a programmable function. Intelligent solid-state switches may include, but are in no way limited to, a BTS 443P smart highside power switch produced by INFINEON. Additionally, any other type of solid-state switch may be used according to the present system and method. The input (In) of the first solid-state switch (530) is electrically coupled to a high-speed control channel (560) of a microcontroller (550) with a bipolar junction transistor (BJT) (535) disposed there between. Similarly, the input (In) of the second solid-state switch (540) is electrically coupled to the low-speed control channel (555) of the microcontroller (550). A BJT transistor (545) is also disposed between the second solid-state switch (540) and the low-speed control channel (555).

According to the exemplary embodiment illustrated in FIG. 5, the two outputs (Out) of the first solid-state switch (530) are electrically coupled to the high-speed terminal (509) of the dual-speed DC motor (505) as shown in FIG. 5. However, the two outputs (Out) of the second solid-state switch (540) are not directly coupled to the low-speed terminal (507) of the dual-speed DC motor (505). Rather, the two outputs (Out) of the second solid-state switch (540) are coupled to the gate driver (525) and the source (S) of a power metal oxide semiconductor field effect transistor (MOSFET) transistor (520) that is connected backwards in the circuit, that is, the source (S) is connected to the power-supply side of the circuit while the drain (D) is connected to the load side. On the load side of the transistor (520), the drain (D) is electrically coupled to the low-speed terminal (507) of the dual DC motor (505). Additionally, the output (G) of the gate driver (525) is coupled to the gate of the power MOSFET transistor (520). Moreover, the Input (In) of the gate driver (525) is electrically coupled to the low-speed control channel (555) of the microcontroller (550). A capacitor (565), a resistor (570), and a number of grounds (510) complete the dual-speed motor circuit (500) illustrated in FIG. 5.

Figure 6:
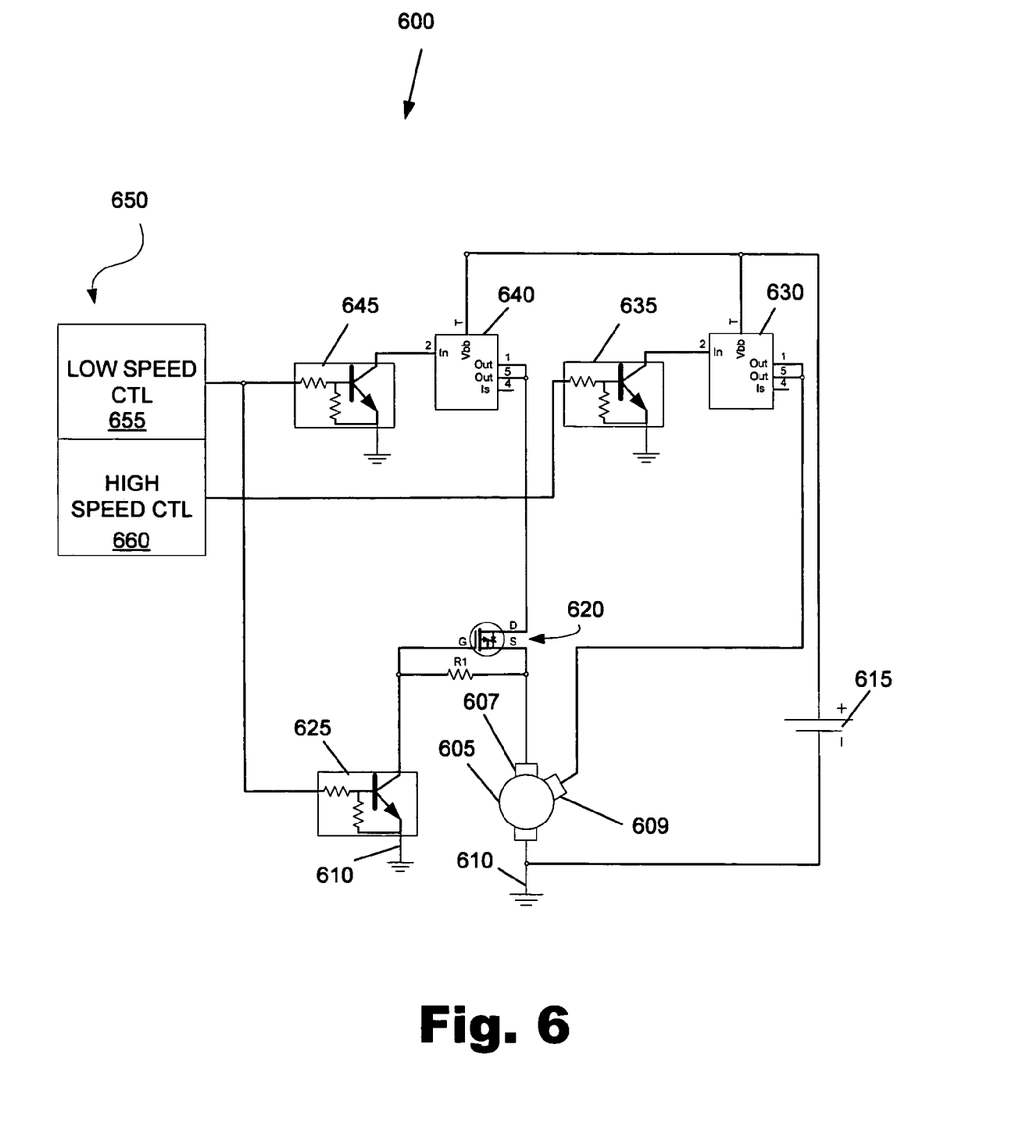
FIG. 6 is a simple circuit diagram illustrating an alternative dual-speed DC motor control that eliminates the sneak path according to one exemplary embodiment.

While the configuration and components of the exemplary circuit of FIG. 5 are illustrated above, the above description in no way limits or otherwise defines the components of the circuit. Rather, a number of alternative components may be used to replace the components described above. For example, the MOSFET transistor illustrated in FIG. 5 may be replaced by an insulated gate bipolar transistor (IGBT) transistor and the two resistors built into the BJTs (545, 535) may be moved outside of the transistor. Moreover, FIG. 6 illustrates an alternative configuration that may be used to eliminate the sneak path for a dual-speed DC motor. FIG. 6 will be described further below with reference to possible alternative embodiments.

Exemplary Implementation and Operation

During operation of the dual-speed motor control circuit (500) illustrated in FIG. 5, the DC power supply (515) provides a current to the Vbb of the first solid-state switch (530), the second solid-state switch (540), and the V+of the gate driver (525). According to one exemplary embodiment, the current provided by the DC power supply (515) is a 14V current.

When the dual-speed motor control circuit (500) illustrated in FIG. 5 is in stop mode, neither the low-speed control (555) nor the high-speed control (560) of the microcontroller (550) is producing an activation signal. Consequently, the first solid-state switch (530), the second solid-state switch (540), and the transistor (520) are all OFF. As a result, the dual-speed motor (505) is off.

During operation in low-speed mode, the low-speed control (555) of the microcontroller (550) provides an activation signal to both the second solid-state switch (540) and the transistor (520). The activation signal provided to the second solid-state switch (540) is provided through the BJT transistor (545). Similarly, the activation signal provided to the transistor (520) is provided through the gate driver (525). Additionally, when operating in low-speed mode, the high-speed control (560) and consequently the first solid-state switch (530) are OFF. According to this exemplary embodiment, activation of both the second solid-state switch (540) and the transistor (520) allows the DC current provided by the DC power supply (515) to be routed to the low-speed terminal (507) of the dual-speed motor (505). In response to the supplied voltage, the dual-speed motor (505) operates in a low-speed mode. During operation, an induced EMF is produced on the high-speed terminal (509) of the motor (505) as described above. However, the value of the induced EMF generated on the high-speed terminal (509) is always lower than the voltage on the low-speed terminal (507) during low-speed operation. Because the EMF produced on the high-speed terminal (509) is low, there is no sneak path and the dual-speed motor control circuit (500) illustrated in FIG. 5 operates in low-speed mode.

When operating in high-speed mode, the dual-speed motor control circuit (500) produces an activation signal from the high-speed control (560) of the microcontroller (550). This activation signal is provided through the BJT (535) and to the IN pin of the first solid-state switch (530), thereby allowing the current provided by the DC power source (515) to pass onto the high-speed terminal of the dual-speed motor (505). Once received by the dual-speed motor (505), the current causes the dual-speed motor (505) to operate in high-speed mode.

As mentioned above, when the dual-speed motor (505) is operating in high-speed mode, the motor acts as both a motor and a generator by producing a high EMF voltage on the low-speed terminal (507). According to one exemplary embodiment, the EMF voltage produced on the low-speed terminal (507) is up to 20V. However, the present dual-speed motor control circuit (500) prevents the formation of a sneak path and prevents the sneak current from damaging the components of the circuit. When the dual-speed motor control circuit (500) is operating in high-speed mode, the low-speed control (555) of the microcontroller (550) does not produce an activation signal. Consequently, the second solid-state switch (540) and the transistor (520) are OFF. By placing the MOSFET transistor (520) backwards in the circuit as illustrated in FIG. 5, when operating in OFF mode, the MOSFET transistor (520) prevents the sneak current generated on the low-speed terminal (507) from passing onto other components of the circuit. Consequently, the dual-speed motor control circuit (500) illustrated in FIG. 5 incorporates solid-state switches and enables operation of the dual-speed motor in high-speed mode without greatly increasing the circuit size or allowing a sneak path. By incorporating solid-state switches, the advantages listed above may be incorporated into the circuit including, but in no way limited to, short circuit protection, over-current protection, over temperature protection, load status detection, no arc problems, no increased resistance with aging, no moving parts to reduce useful life, and reduced size when compared to traditional mechanical switches.

ALTERNATIVE EMBODIMENTS

According to one exemplary embodiment, the cost of the dual-speed motor control (500) illustrated in FIG. 5 may be reduced by utilizing the dual-speed motor control circuit (600) illustrated in FIG. 6. As shown in FIG. 6, the circuit (600) includes a dual-speed DC motor (605) electrically coupled to both a ground (610) and a DC power source (615). In turn, the power source (615) is electrically coupled to the power input (Vbb) of a first (630) and a second (640) solid-state switch. The input (In) of the first solid-state switch (630) is electrically coupled to a high-speed control channel (660) of a microcontroller (650) with a bipolar junction transistor (BJT) (635) disposed there between. The output of the first solid-state switch (630) is then electrically coupled to the high-speed input (609) of the dual-speed motor (605).

Similarly, the input (In) of the second solid-state switch (640) is electrically coupled to the low-speed control channel (655) of the microcontroller (650). A BJT transistor (645) is also disposed between the second solid-state switch (640) and the low-speed control channel (655). According to the exemplary embodiment illustrated in FIG. 6, the low-speed control channel is also electrically coupled to a small transistor (625) that is electrically coupled to a P-type MOSFET transistor (620) disposed between the second solid-state switch and the low-speed terminal (607) of the dual-speed DC motor (605). Similar to the exemplary embodiment illustrated in FIG. 5, the P-type MOSFET transistor (620) illustrated in FIG. 6 is connected backward in the circuit (600) by coupling the drain (D) to the power-supply side of the circuit while the source (S) is connected to the load side, that is, the low-speed terminal (607) of the dual DC motor (605). Additionally, the collector of the gate driving transistor (625) is coupled to the gate of the P-type MOSFET transistor (620).

During operation in high-speed mode, the dual-speed motor control circuit (600) illustrated in FIG. 6 simultaneously enables the first solid-state switch (630) while placing the second solid-state switch (640) and the P-type MOSFET transistor (620) in an OFF state. Accordingly, the P-type MOSFET transistor (620) operating in an OFF state prevents any generated sneak current from following a sneak path to the second solid-state switch (640) in the same manner as illustrated above with reference to FIG. 5.

In conclusion, the present system and method for eliminating a sneak path for dual-speed DC motors incorporates the advantages of solid-state switches while eliminating the sneak path. More specifically, by coupling an inverted transistor between a low-speed input terminal of a dual-speed motor and the low-speed solid-state switch, a potential sneak path is eliminated. Moreover, the present system and method takes advantage of the reduced size of the present solid-state switches while preventing voltage drop and possible thermal damage that may be caused by an unfettered sneak current.

The preceding description has been presented only to illustrate and describe the present system and method. It is not intended to be exhaustive or to limit the present method and system to any precise form disclosed. Many modifications and variations are possible in light of the above teaching.

The foregoing embodiments were chosen and described in order to illustrate principles of the method and system as well as some practical applications. The preceding description enables others skilled in the art to utilize the method and system in various embodiments and with various modifications as are suited to the particular use contemplated. It is intended that the scope of the method and system be defined by the following claims.

What is claimed is:

1. A system for controlling a dual-speed motor comprising:
    a direct current (DC) power supply;
    a dual-speed DC motor;
    a first solid-state switch electrically coupled to said DC power supply and a low-speed input of said dual-speed DC motor;
    a second solid-state switch electrically coupled to said DC power supply and a high-speed input of said dual-speed DC motor; and
    a third solid-state switch electrically coupled between said first solid-state switch and said low-speed input of said dual-speed DC motor, wherein a first side of said third solid-state switch is coupled to a power supply side of said system and a second side of said third solid-state switch is coupled to a load side of said system.

2. The system of claim 1, wherein said first and second solid-state switches comprise intelligent solid-state switches.

3. The system of claim 1, wherein said third solid-state switch comprises one of a power metal oxide semiconductor field effect transistor (MOSFET) or an insulated gate bipolar transistor (IGBT).

4. The system of claim 1, wherein said DC power supply comprises a 14 volt battery.

5. The system of claim 1, further comprising:
a microcontroller including a low-speed control channel and a high-speed control channel electrically coupled to said first, second, and third solid-state switches;
wherein said high-speed control channel is electrically coupled to said second solid-state switch; and
wherein said low-speed control channel is electrically coupled to said first solid-state switch and said third solid-state switch.

6. The system of claim 5, further comprising:
a first transistor electrically coupled between said low-speed control channel and said first solid-state switch; and
a second transistor electrically coupled between said high-speed control channel and said second solid-state switch.

7. The system of claim 6, wherein said first and second transistors comprise bipolar junction transistors (BJT).

8. The system of claim 6, further comprising a third transistor electrically coupled between said low-speed control channel and said third solid-state switch.

9. The system of claim 6, further comprising a gate driver electrically coupled between said low-speed control channel and said third solid-state switch.

10. A system for controlling a dual-speed motor comprising:
a means for supplying power;
a dual-speed DC motor;
a first means for switching electrically coupled to said power supplying means and a low-speed input of said dual-speed DC motor;
a second means for switching electrically coupled to said power supplying means and a high-speed input of said dual-speed DC motor; and
a third means for switching electric ally coupled between said first switching means and said low-speed input of said dual-speed DC motor, wherein a first side of said third switching means is coupled to a power supply side of said system and a second side of said third switching means is coupled to a load side of said system.

11. The system of claim 10, wherein said third switching means comprises a solid-state switch.

12. The system of claim 10, further comprising:
a means for controlling said first, second, and third switching means;
wherein said controlling means is configured to selectively activate said first, second, and third switching means.

13. A method for providing a dual-speed direct current (DC) motor having reduced sneak path comprising:
providing a dual-speed DC motor and a DC power supply, wherein said dual-speed DC motor and said DC power supply are electrically coupled;
providing a first solid-state switch coupled between said DC power supply and a high-speed terminal of said dual-speed DC motor;
providing a second solid-state switch coupled between said DC power supply and a low-speed terminal of said dual-speed DC motor;
providing a third solid-state switch coupled between said second solid-state switch and said low-speed terminal of said dual-speed DC motor; and
arranging said third solid-state switch coupled between said second solid-state switch and said low-speed terminal of said dual-speed DC motor such that said third solid-state switch prevents a sneak current from passing to said second solid-state switch.

14. The method of claim 13, wherein said step of arranging said third solid-state switch comprises:
electrically coupling a first side of said third solid-state switch to said second solid-state switch; and
electrically coupling a second side of said third solid-state switch to said low-speed terminal of said dual-speed DC motor.

15. The method of claim 14, wherein said first and second solid-state switches comprise intelligent solid-state switches.

16. The method of claim 14, wherein said third solid-state switch comprises one of a power metal oxide semiconductor field effect transistor (MOSFET) or an insulated gate bipolar transistor (IGBT).

17. The method of claim 14, further comprising:
providing a microcontroller including a low-speed control channel and a high-speed control channel electrically coupled to said first, second, and third solid-state switches;
wherein said high-speed control channel is electrically coupled to said second solid-state switch; and
wherein said low-speed control channel is electrically coupled to said first solid-state switch and said third solid-state switch.

18. The method of claim 17, further comprising:
electrically coupling a first transistor between said low-speed control channel and said first solid-state switch; and
electrically coupling a second transistor between said high-speed control channel and said second solid-state switch.

19. The method of claim 18, wherein said first and second transistors comprise bipolar junction transistors (BJT).

20. The method of claim 18, further comprising electrically coupling a third transistor between said low-speed control channel and said third solid-state switch.

21. The method of claim 18, further comprising electrically coupling a gate driver between said low-speed control channel and said third solid-state switch.

* * * * *

UNITED STATES PATENT AND TRADEMARK OFFICE
CERTIFICATE OF CORRECTION

PATENT NO. : 7,012,387 B1
DATED : March 14, 2006
INVENTOR(S) : Sam Y. Guo

It is certified that error appears in the above-identified patent and that said Letters Patent is hereby corrected as shown below:

Column 9,
Line 42, change "electric ally" to -- electrically --.

Signed and Sealed this

Twenty-third Day of May, 2006

JON W. DUDAS
*Director of the United States Patent and Trademark Office*